United States Patent [19]

Sullivan et al.

[11] Patent Number: 5,516,847
[45] Date of Patent: *May 14, 1996

[54] GOLF BALL COVER HAVING AN IONIC COPOLYMER/NON-IONIC COPOLYMER BLEND

[75] Inventors: Michael J. Sullivan, Chicopee, Mass.; Terence Melvin, Somers, Conn.

[73] Assignee: Lisco, Inc., Tampa, Fla.

[*] Notice: The term of this patent shall not extend beyond the expiration date of Pat. No. 5,397,840.

[21] Appl. No.: 390,554

[22] Filed: Feb. 17, 1995

Related U.S. Application Data

[63] Continuation-in-part of Ser. No. 22,787, Feb. 23, 1993, Pat. No. 5,397,840, which is a continuation of Ser. No. 753,485, Sep. 3, 1991, abandoned.

[51] Int. Cl.$^6$ .................... A63B 37/12; C08L 23/26; C08L 33/02; C08L 33/06
[52] U.S. Cl. .................... 525/221; 525/196; 525/197; 525/192; 525/195; 473/385
[58] Field of Search .................... 525/221, 196, 525/197, 195; 273/235 R

[56] References Cited

U.S. PATENT DOCUMENTS

| | | | |
|---|---|---|---|
| 3,264,272 | 8/1966 | Rees | 260/78.5 |
| 3,365,520 | 1/1968 | Foster et al. | 260/897 |
| 3,421,766 | 1/1969 | Chmiel et al. | 273/218 |
| 3,454,280 | 7/1969 | Harrison et al. | 273/235 |
| 3,454,676 | 7/1969 | Busse | 260/897 |
| 3,649,578 | 3/1992 | Bush et al. | 260/23 AR |
| 3,789,035 | 1/1974 | Iwami et al. | 260/78.5 T |
| 3,819,768 | 6/1974 | Molitor | 260/897 B |
| 3,940,146 | 2/1976 | Little | 273/235 R |
| 3,969,434 | 7/1976 | Powell et al. | 260/897 B |
| 4,136,069 | 1/1979 | Vachon et al. | 260/23 AR |
| 4,234,184 | 11/1980 | Deleens et al. | 273/235 R |
| 4,323,247 | 4/1982 | Keches et al. | 273/235 R |
| 4,337,946 | 7/1982 | Saito et al. | 273/225 |
| 4,338,227 | 7/1982 | Ballard | 524/143 |
| 4,346,196 | 8/1982 | Hoh et al. | 525/196 |
| 4,410,655 | 10/1983 | Funakoshi et al. | 524/522 |
| 4,431,193 | 2/1984 | Nesbitt | 273/235 R |
| 4,526,375 | 7/1985 | Nakade | 273/235 R |
| 4,545,842 | 10/1985 | Parsons | 156/310 |
| 4,690,981 | 9/1987 | Statz | 525/329.6 |
| 4,735,669 | 4/1988 | Guida et al. | 156/229 |
| 4,798,386 | 1/1989 | Berard | 273/235 R |
| 4,868,033 | 9/1989 | Nakano et al. | 428/201 |
| 4,884,814 | 12/1989 | Sullivan | 273/235 R |
| 4,911,451 | 3/1990 | Sullivan et al. | 273/235 R |
| 4,956,414 | 9/1990 | Muehlenbernd et al. | 525/196 |
| 5,037,700 | 8/1991 | Davis | 428/414 |
| 5,120,791 | 6/1992 | Sullivan | 525/196 |
| 5,397,840 | 3/1995 | Sullivan et al. | 525/221 |
| B1 4,884,814 | 2/1992 | Sullivan | 273/235 R |

FOREIGN PATENT DOCUMENTS 61-044937  3/1986  Japan .

OTHER PUBLICATIONS

Nucrel® 925, Dupont, E–68890, Aug. 1985.
Nucrel® 960, Dupont, E–68884, Sep. 1986.
Experimental Adhesive Polymer XU–60758.05, Dow Chemical Co., U.S.A., Apr. 1991.
Primacor Adhesive Polymers For Specialty Hot Melt Adhesives, Dow Chemical Co., U.S.A., Form No. 305–1177–284, 1984.
Primacor Dispersible Polymers, Dow Chemical Co., Form No. 306–129R–787, undated.
Primacor Adhesive Polymer 1430 For Cast Film, Dow Chemical Co., U.S.A., Form No. 305, 1150–284, 1984.
Nucrel™ 925, Dupont, undated.
ESCOR® Acid Terpolymers, Premium Performance Adhesion Polymers, Exxon Chemical, undated.
Emulsions For Adhesive Products, Air Products and Chemicals, Inc., 1991.
Cyanamid Material Safety Data, American Cyanamid Co., MSDS No. 1074–04, Oct. 22, 1991.
UCAR Emulsion Systems, Union Carbide Corp., No. 0233209–001, 1990.
Dispercoll U Polyurethane Dispersions, General Information On Properties And Compounding For Adhesive Application, Mobay Corporation, Aug. 1990.
Neoprene Latex, Toxicity and Handling Guidelines For Neoprene Latexes, NL–110.1, E–75676, Nov. 1985.
Neoprene Latex, Neoprene Latex 115, NL–024.115, E–36075–1, Dec. 1986.
Nucrel, Acid Copolymer Resins, DuPont Chemical Co., E–68895, undated.
Nucrel® Resins, For Molding, Compounding and Extrusion, Price list—Effective Aug. 1, 1983 No. E–59894.
Nucrel—Miscellaneous, undated.
Nucrel® 599, Dupont, E–68892, Sep. 1986.
Nucrel® 699, Dupont, E–68886–1, Nov. 1986.
Nucrel® 714, Dupont, E–68885, May 1986.
Nucrel® 403, Dupont, E–68880, Sep. 1986.
Nucrel® 410, Dupont, E–68881, May 1986.
Nucrel® 535, Dupont, E–68883, May, 1986.
Elvax® Resins for Molding, Compounding, and Extrusion, A Grade Selection Guide, Dupont, undated.
Nucrel® 010, Dupont, E–68882–1, undated.
Nucrel® 035, Dupont, undated.

*Primary Examiner*—Carman J. Seccuro, Jr.

[57] ABSTRACT

The present invention is directed to a golf ball cover comprising a blend of copolymers wherein one or more of the copolymers is a low cost non-ionic copolymer and one or more of the copolymers is an ionic copolymer. Surprisingly, a golf ball cover comprising the non-ionic/ionic copolymer blend exhibits no loss in C.O.R., and has equal resistance to cutting and cracking when compared to top grade golf ball covers made with one of the conventional 100% ionic copolymer blends. In particular, the present golf ball cover comprises from about 95 to about 80 pphr of one or more ionic copolymers, and from about 5 to about 20 pphr of one or more non-ionic copolymers, the latter being selected from the group consisting of a copolymer or terpolymer of ethylene or propylene; acrylic acid or methacrylic acid; a lower alkyl acrylate, and blends thereof.

29 Claims, 1 Drawing Sheet

GOLF BALL COVER HAVING AN IONIC COPOLYMER/NON-IONIC COPOLYMER BLEND

CROSS-REFERENCE TO RELATED APPLICATIONS

This application is a continuation-in-part of U.S. Ser. No. 08/022,787, filed Feb. 23, 1993, now U.S. Pat. No. 5,397,840, which is a continuation of U.S. Ser. No. 07/753,485, filed Sep. 3, 1991, now abandoned. The two applications identified in the preceding sentence are hereby incorporated herein by reference in their entirety.

BACKGROUND OF THE INVENTION

This invention relates to a novel golf ball cover which contains a low cost non-ionic copolymer in combination with an ionic copolymer. More particularly, the present invention relates to a golf ball cover containing at least one ionic copolymer and at least one non-ionic copolymer wherein the latter is selected from the group consisting of a copolymer of ethylene and acrylic acid, a copolymer of ethylene and methacrylic acid, a copolymer of polypropylene and acrylic acid, and blends thereof. The present invention is useful because it provides a high quality golf ball cover at a relatively low cost.

The coefficient of restitution ("C.O.R.") of a golf ball is generally measured by propelling a finished golf ball against a hard surface at a fixed velocity, and measuring its forward velocity (before it rebounds) and rebound velocity (after it rebounds). The ratio of the rebound velocity to the forward velocity is the C.O.R. The C.O.R. must be carefully controlled in all commercial golf balls in order for the ball to be within the 255 ft./second initial velocity standard set by the United States Golfer's Association.

Although the core and the cover both contribute to the C.O.R., this invention addresses the C.O.R. as affected by the cover material.

Golf ball covers having a high C.O.R. and a combination of other beneficial properties, such as high durability, a high cut resistance, and a long life, have traditionally been made from a blend of two or more ionic copolymers in particular proportions. For example, U.S. Pat. No. 3,819,768 (Molitor) discloses a golf ball cover having these mentioned properties comprising a mixture of from 10%–90% of an ionic copolymer of a sodium salt and from 90%–10% of an ionic copolymer of a zinc salt. U.S. Pat. No. 4,333,247 (Ketches et al.) discloses a golf ball cover composed of at least three ionic copolymers.

A problem with these golf ball covers is that they require that 100% of the copolymer in the composition be ionic. Even U.S. Pat. No. 3,454,280 (Harrison), which utilized a single ionic copolymer, required that it constitute 100% of the disclosed covers. However, a disadvantage with utilizing 100% ionic copolymers as the sole source of copolymers in a golf ball cover is that the ionic copolymers are expensive.

Golf ball covers produced from less expensive copolymers of varying types have lacked the durability, the cut resistance, and the high C.O.R. exhibited by golf ball covers containing 100% ionic copolymers.

U.S. Pat. No. 3,454,676 (Busse) teaches the blend of an ionic copolymer with an elastomer to produce a solid one piece golf ball. Although the ionic copolymer/elastomer blend of Busse was suited for producing 1 piece golf balls, such as used on driving ranges, it had an insufficient C.O.R., durability, and cut resistance to be used as the thin skinned cover material in the production of a high quality two-piece or three-piece competition golf ball.

Other compositions which were intended to improve the characteristics of a golf ball cover included mixtures of an ionomer resin either with chlorosulfonated polyethylene (e.g., U.S. Pat. No. 3,940,146) or with an ethylene-vinyl acetate copolymer. However, according to U.S. Pat. No. 4,234,184 (Deleens, et al.), which was filed on Feb. 15, 1979, "the covers prepared from these [two] compositions [among others] were not judged wholly satisfactory."

An object of the present invention is to produce a less costly golf ball cover that does not significantly sacrifice the desirable properties of high durability, high cut resistance, and high C.O.R. (or initial velocity) which are found in golf ball covers employing 100% ionic copolymer.

SUMMARY OF THE INVENTION

The present invention is a high quality golf ball cover comprising a blend of copolymers wherein at least one of the copolymers is an ionic copolymer and at least one of the copolymers is a low cost non-ionic copolymer. Surprisingly, a golf ball cover having the disclosed ionic copolymer/non-ionic copolymer blend exhibits no (or substantially no) decrease in durability or cut resistance when compared to covers made with conventional blends of two or more ionic copolymers. This relation is true for a wide variety of ionic copolymers having different cations.

In particular, the present invention is a golf ball cover comprising a copolymer blend having from about 95 to about 80 parts of at least one ionic copolymer and from about 5 to about 20 parts of at least one non-ionic copolymer. More preferably, the cover material of the present invention contains from about 90 to about 85 parts of at least one ionic copolymer and from about 10 to about 15 parts of at least one non-ionic copolymer.

DETAILED DESCRIPTION OF THE INVENTION

The present invention is directed to a golf ball cover. In its broad aspect, the cover material of the invention comprises a polymer blend having from about 95 to about 80 parts of at least one ionic copolymer and from about 5 to about 20 parts of at least one non-ionic copolymer. More preferably, the cover material of the present invention contains from about 90 to about 85 parts of at least one ionic copolymer and from about 10 to about 15 parts of at least one non-ionic copolymer.

The terms "parts" or "pphr" as used herein mean parts by weight of a particular ingredient per 100 parts by weight of polymer resin in the complete formulation.

The terms "ionic copolymer" or "ionomer" as used herein include copolymers of an α-olefin that has from 2–6 carbon atoms and of a salt of an α,β-unsaturated carboxylic acid that has from 3–5 carbon atoms. The acid units, which comprise 9–20% by weight of the copolymer, are randomly distributed along the copolymer chain. ("Salt" as used herein refers to ammonium salts and other salts of non-metallic cations, in addition to salts of metallic elements.) The acid units in the described copolymer are partially neutralized to the extent desired, typically from about 18% to about 80%, to produce carboxylate anions which are associated with cations.

Exemplary cations contemplated for use herein include metallic cations and nonmetallic cations. Exemplary metallic cations include alkali metals such as sodium, potassium, and lithium; alkaline earth metals, such as calcium, magnesium, beryllium, strontium, or barium; and transition metals. The transition metals contemplated for use herein include Group VIII metals, such as nickel; Group IIB metals, such as zinc; Group VIIB metals, such as manganese; and others. Exemplary non-metallic cations contemplated for use here in include ammonium.

Because neutralization of the ionic copolymer is only partial, the terms used herein, relating to the "salt of an $\alpha,\beta$-unsaturated carboxylic acid," are understood to mean the partially neutralized salt of that acid. The production of ionic copolymers is taught in U.S. Pat. Nos. 3,264,272 and 3,421,766, which are incorporated herein by reference.

Many ionic copolymers are commercially available which can be used to carry out the present invention. Cation-neutralized copolymers of ethylene and acrylic acid are commercially available under the trademark Escor® and/or Iotek® from Exxon Chemical Co., Houston, Tex. The lithium and potassium neutralized copolymers of ethylene and acrylic acid are commercially available under the trademark Iotek® from Exxon Chemical Co., Houston, Tex. The Escor® and/or Iotek® copolymers vary from one another as to neutralizing ion (such as sodium, potassium, lithium, calcium, magnesium or zinc), the ratio of the ethylene and acrylic acid components, and the percentage of neutralization.

Ionic copolymers of ethylene and methacrylic acid are commercially available under the trademark Surlyn® by E. I. DuPont de Nemours & Co., Wilmington, Del. Like the Escor® copolymers, the Surlyn® copolymers also differ from one another as to neutralizing ion (such as sodium or zinc), the ratio of components, and the percentage of neutralization. Specific examples of suitable commercially available ionic polymers contemplated here include Escor® 4000 and Escor® 900 (Escor® 4000 and 900 have since been re-named as Iotek® 7030 and Iotek® 8000); Iotek® EX-989, -990, -991, -992, -993, or -994; the DuPont copolymers Surlyn® 1559, 7930, or 8528; Escor® 4200, 906, 562, 8020, 8030, 7010, or 7020; Hi-Milan 7311, sold by Mitsui-Dupont Polychemicals Co. LTD., Tokyo 100, Japan, which is neutralized with magnesium cations; and others.

The term "non-ionic copolymer" as used herein includes copolymers of ethylene and acrylic acid; copolymers of ethylene and methacrylic acid; copolymers of propylene and acrylic acid; terpolymers of ethylene, acrylic or methacrylic acid, and a softening third component selected from the group of lower alkyl acrylates and lower alkyl methacrylates; blends of those materials; and other combinations of these or comparable monomers. (The term "lower alkyl" as used herein refers to straight or branched chain hydrocarbons having from 1–4 carbon atoms.)

Non-ionic copolymers contemplated herein include an ethylene-methacrylic acid copolymer or an ethylene-acrylic acid copolymer. An exemplary ethylene-acrylic acid copolymer is commercially available under the trademark Primacor® (Dow Chemical Co., Midland, Mich.), while an exemplary ethylene-methacrylic acid copolymer is commercially available under the trademark Nucrel® (E. I. DuPont de Nemours & Co., Wilmington, Del.). Other non-ionic copolymers which are useful here, such as polypropylene-acrylic acid copolymers, are commercially available under the trademark Polybond® (BP Performance Polymers Inc., Hackettstown, N.J.). Nonionic terpolymers that are suitable for use in the present invention include the ethylene-acrylic acid based terpolymers of Exxon that are commercially available under the ESCOR® trademark, such as ATX 310, ATX 320, ATX 325, and ATX 350. It is believed that the third component of the ESCOR® ethylene-acrylic acid terpolymers is a lower alkyl acrylate or methacrylate, such as methyl or butyl acrylate or butyl methacrylate.

The golf ball covers of the present invention are formulated by mixing from about 95 to about 80 parts of at least one ionic copolymer and from about 5 to about 20 parts of at least one non-ionic copolymer, preferably from about 90 to about 85 parts of at least one ionic copolymer and from about 10 to about 15 parts of at least one non-ionic copolymer.

The non-ionic copolymer is preferably the copolymer of ethylene and acrylic acid or ethylene and methacrylic acid.

It is within the scope of the present invention to admix into the cover composition compatible materials in amounts sufficient to achieve the desired effect but which do not affect the basic and novel characteristics of the ionic/non-ionic copolymer composition of this invention. Among such materials are coloring agents, including dyes, pigments, and brighteners, fillers, and additives such as antioxidants, antistatic agents, and stabilizers.

Suitable fillers known to the art include, but are not hereby limited to, titanium dioxide, zinc oxide, barium sulfate, zinc sulfate, and the like. Such fillers are generally present in the covering composition in amounts ranging from about 1 pphr to about 10 pphr. Titanium dioxide is contemplated as a filler in amounts of from about 1 pphr to about 5 pphr.

Antioxidants, such as Santonox R (Monsanto), when used, are generally present in amounts of from about 0.001 pphr to about 0.10 pphr. One contemplated antioxidant is Santonox R.

The mixing of the copolymers and other components of the golf ball cover composition is accomplished on a mixer, such as a Banbury mixer or a rubber mill, to which sufficient heat is applied (e.g., 130°–150° C., i.e., 292°–328° F.) to obtain a homogeneous mixture. The use of such techniques is well known in the art. See, for example, U.S. Pat. No. 3,264,272 (Rees) which is incorporated herein by reference. The resultant homogeneous mixture of the golf ball cover composition may either be cooled and ground into pellets for later use, or fed directly into a machine for injection molding over a core or for injection molding into half shells.

The cover composition of the present invention may be used to cover both wound and solid cores. By the term "solid core" as used herein is meant not only a one piece core, but also a ball having a separate solid layer beneath the cover and above the core, as in U.S. Pat. No. 4,431,193, and other multilayer and/or non-wound cores. Golf balls utilizing the present cover and/or cover composition can be formed using any one of the methods known to the art for covering cores. For example, a selected core may be placed in the center of a golf ball mold and the cover composition injected into and retained in the space for a suitable period of time at a mold temperature of from about 40° F. to about 120° F. (4° C. to about 49° C.) which temperature is dependent upon the copolymer blend.

For the copolymer blend which comprises from about 10–15 parts by weight of the ethyleneacrylic acid copolymer, Primacor® 1430, and from about 90–85 parts by weight of the TG Surlyn® blend, the mold temperature ranges from about 60° F. to about 75° F. (16° C. to about 24° C.) for a 30 second cooling cycle.

Alternatively, the cover composition may be formed into hemispherical shells by injection molding at 300° F. to 400° F. (149° C. to 204° C.). A pair of such smooth surface shells are positioned about a core, placed in a dimpled mold, and subjected to compression molding at an appropriate temperature ranging from 100° F.–200° F. (38° C.– 93° C.) to achieve unification. Thus, the golf ball cover composition of this invention may be used with any method for forming golf ball covers.

The core material is not an integral part of the present invention. Hence, a detailed discussion concerning the specific types of core materials which may be utilized with the golf ball cover and cover compositions of the present invention is not specifically set forth herein. In this regard, the golf ball cover and cover compositions of the invention may be used in conjunction with any suitable golf ball core.

Determination of C.O.R. and "Expected C.O.R."

The coefficient of restitution ("C.O.R.") was measured for the examples of this application by propelling a finished golf ball from an air cannon at a velocity of 125 feet per second against a steel plate positioned 12 feet from the muzzle of the cannon, measuring its forward velocity (before it rebounds) and rebound velocity (after it rebounds). The ratio of the rebound velocity to the forward velocity is reported as the C.O.R.

The "expected C.O.R." of a golf ball having a cover that is a blend of an ionic copolymer component and a non-ionic copolymer component was obtained by plotting the coefficients of restitution of the pure ionic copolymer, the pure non-ionic copolymer, and the blend in question (for example, along the y- or vertical axis) versus the proportion of each component in the blend (for example, along the x- or horizontal axis).

Figure 1:
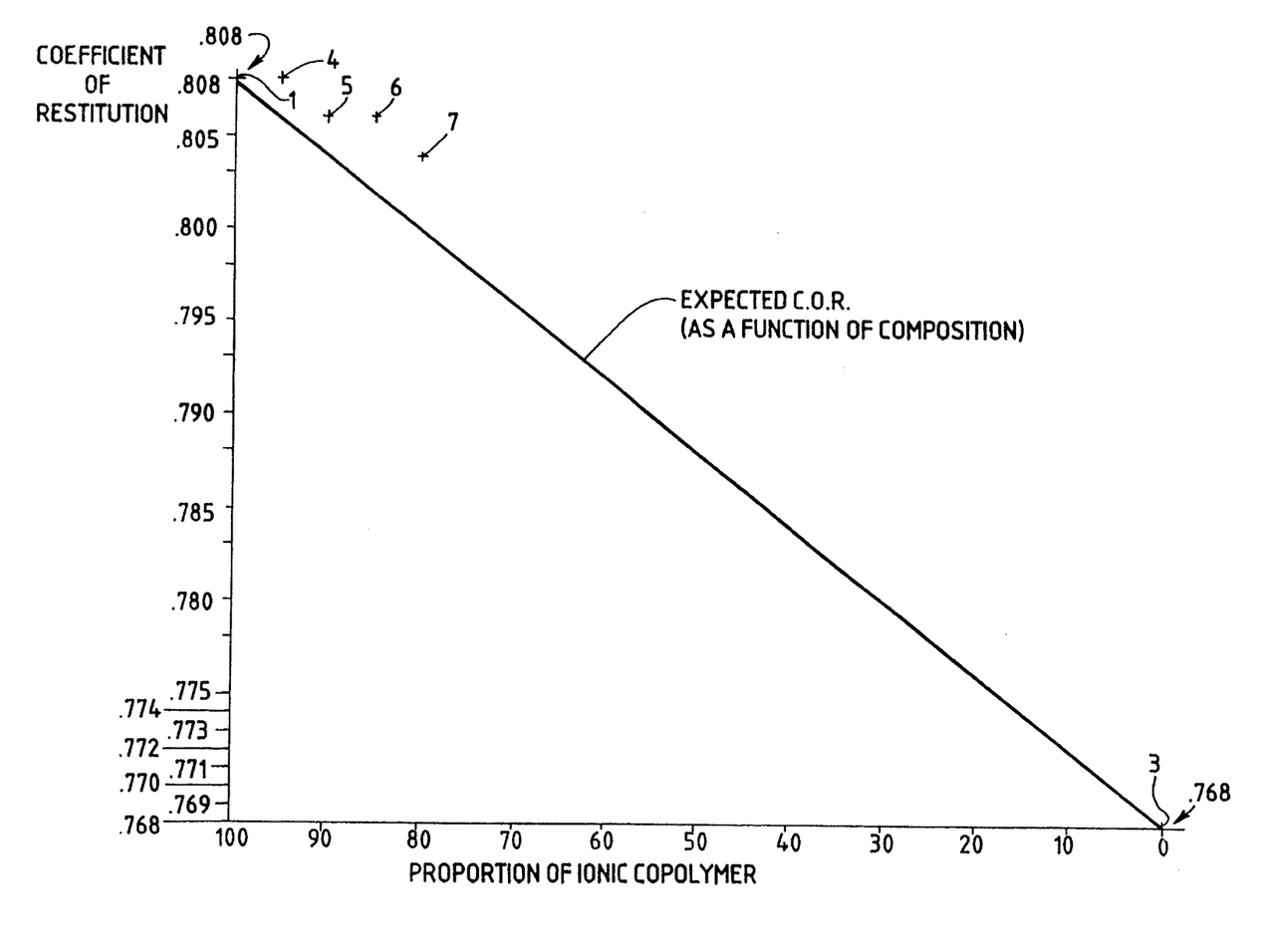
The FIGURE is a plot of the coefficient of restitution versus proportion of ionic copolymer for several of the golf balls identified in Table 7.

This derivation is shown in the FIGURE, which plots data for columns 1 and 3–7 of Table 7. Each data point is identified in the FIGURE by a reference character indicating the example number in Table 7. A straight line is drawn through the two data points 1 and 3 representing the C.O.R.'s of the respective all-ionic and all-nonionic golf balls (i.e. 100% ionic and 0% ionic). This plot represents the expected C.O.R. for blends of ionic and nonionic polymers. In the FIGURE, the expected C.O.R. plot crosses the y-axis for the golf ball having the 100% SURLYN 7930 (ionic copolymer) cover and a C.O.R. of 0.808, and crosses the x-axis for the golf ball having a 100% PRIMACOR 3414 non-ionic copolymer cover and a C.O.R. of 0.768.

The measured C.O.R. for the blended covers in Table 7B, examples 4, 5, 6, and 7, was then plotted against the proportion of ionic copolymer in the blend (i.e. data points 4, 5, 6, and 7) and compared to the "expected C.O.R." line. Those data points which are above the line represent a C.O.R. for that composition which is higher (better) than expected. In Table 7B, the data points 4, 5, 6, and 7, respectively representing 95%, 90%, 85%, and 80% proportions of the ionic copolymer, are all higher than the "Expected C.O.R." line, and thus each is higher than expected and within the present invention.

For the other tables, the preceding process or a comparable calculation was carried out, and the expected and measured C.O.R. data for each particular composition are expressed in numerical form. Again, where the measured C.O.R. is higher than the expected C.O.R., the present invention is being practiced.

EXAMPLES

Golf balls which were identical except for their cover compositions were made and tested as described in Tables 1–8. The resins used in the cover compositions were a pure ionic copolymer, a pure non-ionic copolymer, or a blend of the two. The cover compositions and the expected and actual C.O.R. and other relevant properties of golf balls were measured, and the measurements obtained are given in the tables. Some of the measurements for Table 7 are also plotted in the FIGURE.

Table 1 lists the compositions in weight percent of the components both in a "top grade" and in a "low cost" Surlyn® based golf ball cover. Although three (3) different ionic copolymers are employed to form both the "top grade" and the "low cost" Surlyn® golf ball covers, the copolymer blend in each cover is 100% ionic copolymer. These ionic copolymer covers represent the control material against which the ionic/non-ionic cover material of the present invention is compared.

Table 2 compares the properties of a golf ball having the "top grade" all ionomer cover (Formulation 1) to a number of otherwise identical golf balls (Examples 2 to 13) which differ from Example 1 in that they have a cover that contains 5, 10 or 15 pphr of various non-ionic copolymers in the copolymer blend. Specifically, Examples 11 to 13 represent golf balls having covers comprising a blend of the "top grade" Surlyn® to which was added 5, 10, or 15 pphr of the monocomponent polymer low density polyethylene ("LDPE"), which is commercially available as Alathon 2010. For examples 11 to 13, the C.O.R., the barrel test, and the cut test each indicated significantly decreasing performance with increasing amounts of LDPE. Even the addition of only 5% LDPE to the cover composition caused the C.O.R. of the golf ball to drop from 0.807 to 0.801, a drop of 0.006 relative to the identical golf ball with the 100% ionic copolymer ("top grade") cover.

Examples 8 to 10 in Table 2 represent golf balls having covers comprising the "top grade" Surlyn®, to which was added 5, 10, or 15 pphr of a copolymer of ethylene and vinyl acetate, i.e., Elvax® 560, which is available from DuPont, Wilmington, Del. For the three formulations tested, the C.O.R., the barrel test, and the cut test each indicated decreasing performance with increasing amounts of the ethylene-vinyl acetate copolymer in the cover composition. Overall, the results were better when ethylene-vinyl acetate copolymer was the additive, rather than when LDPE was the additive. Nevertheless, when ethylenevinyl acetate copolymer was present in the cover at 15 pphr (Example 10), five out of six balls broke in the barrel test. The "barrel test" or "Barrel Durability Testing" involves firing golf balls at 135 ft./sec. (at 72° F.), into a 5-sided container, the walls of which are steel plates that have grooves milled into them to simulate a golf club face. The balls are subjected to 100 to 300 blows and are inspected at regular intervals for breakage (i.e., any signs of cover cracking or delamination).

Examples 5 to 7 of Table 2 represent golf balls having covers of the present invention. These covers comprise a blend of the "top grade" Surlyn® with 5, 10, or 15 pphr of the copolymer of ethylene and an acrylic acid, Primacor® 1430, which is available from Dow Chemical Co., Midland, Mich. For Examples 5 to 7, there was no significant decrease in any of the observed properties. Even when the ethylene and acrylic acid copolymer (Primacor® 1430) comprised 15 pphr of the copolymer in the composition, the C.O.R. only decreased from 0.807 to 0.806 relative to the control represented by the 100% ionic copolymer composition of Example 1.

Further, there was no significant decrease in durability. The durability was based upon no breaks ("N.B.") in the barrel test and upon no increase in the severity of cuts during the cut test. The "cut test" involves firing a golf ball at 135 ft./sec. against the leading edge of a pitching wedge, wherein the leading edge radius is 1/32", the loft angle is 51 degrees, the sole radius is 2.5", and the bounce angle is 7 degrees. The cut resistance of the balls tested was evaluated on a scale of 1–5. The number 5 represents a cut that extends completely through the cover to the core; 4 represents a cut that does not extend completely through the cover but that does break the surface; 3 does not break the surface but does leave a permanent dent; 2 represents a slight crease which is permanent but not as severe as 3; and 1 represents virtually no visible indentation or damage of any sort.

Examples 2 to 4 of Table 2 also represent golf balls having covers of the present invention. In Examples 2 to 4, the non-ionic copolymer is a copolymer of ethylene and methacrylic acid, i.e., Nucrel® 925, which is available from DuPont. When the copolymer of ethylene and methacrylic acid comprised up to 15 pphr of the copolymer blend in the golf ball cover, no significant decrease was observed in the C.O.R. nor in the durability of those golf balls.

Table 3 compares the properties of golf balls having top grade ("TG") Surlyn® and low cost ("LC") Surlyn® covers to those same golf balls having covers comprising either TG or LC Surlyn® to which has been added 10 and 15 pphr by weight of Primacor® 1430, respectively. In preparing Table 3, 25 dozen golf balls of each type were measured. As reflected in Table 3, the golf balls that had covers comprising the ionic/non-ionic copolymer blend tested satisfactorily for cold crack resistance, cut resistance, paint adhesion and durability in the barrel test. The C.O.R.s show only a slight decrease upon addition of non-ionic copolymer to both LC and TG.

After three months of range testing the golf balls of Table 3, those golf ball covers that contained 10 pphr ethylene-acrylic acid copolymer (Primacor®) in both the TG and LC Surlyn® base performed equally as well as those covers that were 100% TG and 100% LC Surlyn®, i.e., all ionomer. At the 15 pphr Primacor® level, there was a noticeable, but not significant, increase in the number of scratched and cut balls in the "cut test".

Tables 4 and 5 compare the properties of golf balls having a top grade Iotek® (100% ionomer) cover to those same golf balls having a cover comprising top grade Iotek® to which has been added 5, 10, 15 and 20 parts, respectively, of non-ionic copolymers as defined herein. In Table 4, the non-ionic copolymers included: Primacore® 5981 (75 wt. % ethylene and 25 wt. % acrylic acid); Nucrel® 925 (85 wt. % ethylene and 15 wt. % methacrylic acid); Primacor® 3414 (85 wt. % ethylene and 15 wt. % acrylic acid); and Nucrel® 010 (a terpolymer of ethylene, methacrylic acid and n- or iso-butyl acrylate).

In Table 4, each of the golf balls having a cover that was a blend from 95–80 parts of top grade Iotek® with from 5–20 parts respectively of the non-ionic copolymer exhibited an observed coefficient of restitution ("C.O.R.") that was significantly greater than the "expected C.O.R."

Also, in Table 4, the cold crack test indicated that golf balls having the blended ionic copolymer/non-ionic copolymer covers of the present invention did not exhibit cold cracking (N.B.=no breaks). This is the same result that was obtained with golf balls having the more expensive covers composed of 100 pphr ionomer).

According to the cut test in Table 4, there was an increase in the cut rate of golf ball covers comprising a blend of the top grade Iotek® at 85 and 80 pphr and the non-ionic terpolymer, Nucrel® 010, at 15 and 20 pphr respectively.

Tables 5, 7 and 8 are analogous to Table 4 and reflect the properties of golf balls having an ionomer cover to which was added 5, 10, 15 or 20 pphr of non-ionic copolymer. In Table 5, the ionic/non-ionic copolymer blend covers employed three Escor® (non-ionomer) terpolymer resins in the 5–20 pphr range. Of the three Escor® resins, ATX 310 was the hardest and ATX 325 was the softest. In Table 5, the golf balls having the ionic copolymer/non-ionic copolymer blended covers showed no increase in the cold cracking notwithstanding the dilutional effect by the non-ionomer on the cross linking in ionomer resin. Moreover, the combination of top grade Iotek® with Escor® ATX 310 exhibited a C.O.R. that was greater than predicted when Escor® ATX 310 comprised 10, 15, and 20 pphr in the copolymer blend of the cover.

With the two increasingly softer Escor® resins, ATX 320 and 325 respectively, softer covers, as manifested by an increasingly lower C.O.R., are produced. To the professional golfer, a golf ball with the softer cover is preferred. Softer golf balls have better spin characteristics and are capable of gripping the green. In contrast, golf balls with a harder cover are preferred by the average golfer to obtain not only greater distance but greater golf ball durability. Thus, there is a tradeoff between hardness, which provides distance and durability to the non-pro golfer, and softness, which imparts the control desired by the professional golfer.

Like the terpolymer of Table 4, (i.e., Nucrel® 010), the three terpolymers of Table 5 all produced softer golf ball covers such as preferred by the professional golfer.

In Tables 7 and 8, the Iotek® EX-993 and Surlyn® 7930 materials contain lithium cations, the EX-994 material contains potassium cations, and the Hi-Milan® material contains magnesium cations.

Thus, according to the data in Tables 4, 5, 7 and 8, golf ball covers that are a blend of from 95–80 pphr of ionic copolymer, such as top grade Iotek®, and from 5–20 pphr of a non-ionic copolymer, such as those described herein, all exhibit good cold crack resistance. Tables 4, 5, 7 and 8 also generally indicate that golf ball covers having unexpectedly increased C.O.R.s with no loss in cut resistance occur when the non-ionomeric copolymer has only two polymeric components, i.e., is not a terpolymer. (Escor® ATX 310 is at least a partial exception.)

Table 6 compares the observed C.O.R. of golf balls having the top grade Iotek® cover, i.e., an all ionic copolymer cover, to a variety of golf balls, each having an all (i.e., 100 pphr) non-ionic copolymer cover. Table 6 also normalizes the observed C.O.R.s of the golf balls having the non-ionomer covers relative to the observed C.O.R. for golf balls having the "top grade" Iotek cover of Tables 4 and 5. Normalization compensates for differences in the lots of core material between Tables 4–6 and permits the graphic drawing of an expected line of C.O.R.s for the blended ionomer/non-ionomer covers of Tables 4 and 5.

The Examples illustrate that, in a high quality golf ball cover made from an ionic copolymer, a substantial amount of a low cost non-ionic copolymer can be substituted, with better-than expected results. Surprisingly, a golf ball cover having the disclosed ionic copolymer/non-ionic copolymer blend exhibits no (or substantially no) decrease in durability or cut resistance when compared to covers made with conventional blends of two or more ionic copolymers. This relation is true for a wide variety of ionic copolymers having different cations.

TABLE 1

| | Top Grade White (%) | Low Cost White (%) |
|---|---|---|
| Surlyn ® 1605Na | 68.53 | 68.44 |
| Surlyn ® 1706Zn | 21.87 | — |
| Surlyn ® 1554Zn | — | 22.22 |
| Surlyn ® 1557Zn | — | — |
| Surlyn ® 1559Na | 7.21 | 7.07 |
| Unitane 0–110 TiO$_2$ | 2.29 | 2.25 |
| Ultra Marine Blue | 0.023 | 0.0133 |
| Uvitex OB Optical Brightener | 0.10 | — |
| Santonox R Stabilizer | | 0.0033 |
| | 100.023 | 99.9966 |

TABLE 2A

| | Example: | | | |
|---|---|---|---|---|
| | 1 | 2 | 3 | 4 |
| Top Grade Surlyn ® | 100 | 95 | 90 | 85 |
| Nucrel ® 925 | — | 5 | 10 | 15 |
| Primacor ® 1430 | — | — | — | — |
| Elvax ® 560 | — | — | — | — |
| Alathon 2010[1] | — | — | — | — |
| Weight (grams) | 45.3 | 45.2 | 45.2 | 45.2 |
| Compression | 58 | 55 | 55 | 57 |
| C.O.R. | .807 | .808 | .808 | .807 |
| Barrel (6 balls tested) (300 blows each) | NB | NB | NB | NB |
| Cut Test (1 = No visible marking) (5 = Clean Cut) | 2–3 | 2–3 | 2–3 | 3 |

[1]Low density prolyethlene.

TABLE 2B

| | Example: | | |
|---|---|---|---|
| | 5 | 6 | 7 |
| Top Grade Surlyn ® | 95 | 90 | 85 |
| Nucrel ® 925 | — | — | — |
| Primacor ® 1430 | 5 | 10 | 15 |
| Elvax ® 560 | — | — | — |
| Alathon 2010[1] | — | — | — |
| Weight (grams) | 45.2 | 45.2 | 45.2 |
| Compression | 57 | 57 | 58 |
| C.O.R. | .808 | .807 | .806 |
| Barrel (6 Balls tested) (300 blows each) | NB | NB | NB |
| Cut Test (1 = No visible marking) (5 = Clean Cut) | 2–3 | 2–3 | 3 |

[1]Low density polyethylene.

TABLE 2C

| | Example: | | |
|---|---|---|---|
| | 8 | 9 | 10 |
| Top Grade Surlyn ® | 95 | 90 | 85 |
| Nucrel ® 925 | — | — | — |
| Primacor ® 1430 | — | — | — |
| Elvax ® 560 | 5 | 10 | 15 |
| Alathon 2010[1] | — | — | — |
| Weight (grams) | 45.2 | 45.1 | 45.1 |
| Compression | 56 | 57 | 53 |
| C.O.R. | .806 | .804 | .803 |
| Barrel (6 Balls tested) (300 blows each) | NB | NB | 5 |
| Cut Test (1 = No visible marking) (5 = Clean Cut) | 3 | 3–4 | 4–5 |

[1]Low density polyethylene.

TABLE 2D

| | Example: | | |
|---|---|---|---|
| | 11 | 12 | 13 |
| Top Grade Surlyn ® | 95 | 90 | 85 |
| Nucrel ® 925 | — | — | — |
| Primacor ® 1430 | — | — | — |
| Elvax ® 560 | — | — | — |
| Alathon 2010[1] | 5 | 10 | 15 |
| Weight (grams) | 45.2 | 45.2 | 45.1 |
| Compression | 55 | 55 | 55 |
| C.O.R. | .801 | .801 | .786 |
| Barrel (6 Balls tested) (300 blows each) | 4 | 5 | 6 |
| Cut Test (1 = No visible marking) (5 = Clean Cut) | 3–4 | 4–5 | 4–5 |

[1]Low density polyethylene.

TABLE 3A

SURLYN ® /PRIMACOR ® GOLF BALL PROPERTIES

| | LC[1] | TG[2] | LC10%[3] |
|---|---|---|---|
| Weight | 46.2 | 45.5 | 46.1 |
| Compression[7] | 50 | 48 | 49 |
| C.O.R. | .786 | .811 | .784 |
| Cold Crack | N.B.[8] | N.B. | N.B. |
| Barrel Test | N.B. | N.B. | N.B. |
| Wet Barrel (Paint Adhesion) | E.A.[9] | E.A. | E.A. |
| Cut Test (1 - No mark) (5 - Clean cut) | 3 | 2 | 2–3 |

[1]Low Cost Surlyn ®, Table 1.
[2]Top Grade Surlyn ®, Table 1.
[3]"LC" substituted with 10% Primacor ®.
[4]"LC" substituted with 15% Primacor ®.
[5]"TG" substituted with 10% Primacor ®.
[6]"TG" substituted with 15% Primacorv ®.
[7]Riehle compression is a measurement of the deformation of a golf ball in inches under a fixed static load of 200 pounds.
[8]No breaks.
[9]Excellent adhesion.

TABLE 3B

SURLYN ® /PRIMACOR ® GOLF BALL PROPERTIES

|  | LC15%[4] | TG10%[5] | TG15%[6] |
|---|---|---|---|
| Weight | 46.1 | 45.4 | 45.4 |
| Compression[7] | 51 | 48 | 48 |
| C.O.R. | .782 | .810 | .808 |
| Cold Crack | N.B. | N.B. | N.B. |
| Barrel Test | N.B. | N.B. | N.B. |
| Wet Barrel (Paint Adhesion) | E.A. | E.A. | E.A. |
| Cut Test (1 - No mark) (5 - Clean cut) | 2–3 | 2–3 | 2–3 |

[1] Low Cost Surlyn ®, Table 1.
[2] Top Grade Surlyn ®, Table 1.
"LC" substituted with 10% Primacor ®.
"LC" substituted with 15% Primacor ®.
"TG" substituted with 10% Primacor ®.
"TG" substituted with 15% Primacorv ®.
[7] Riehle compression is a measurement of the deformation of a golf ball in inches under a fixed static load of 200 pounds.
[8] No breaks.
[9] Excellent adhesion.

TABLE 4A

|  | Example: | | | | |
|---|---|---|---|---|---|
|  | 1 | 2 | 3 | 4 | 5 |
| Top-Grade Iotek* | 100 | 95 | 90 | 85 | 80 |
| Primacor ® 5981 | — | 5 | 10 | 15 | 20 |
| Nucrel ® 925 | — | — | — | — | — |
| Primacor ® 3414 | — | — | — | — | — |
| Nucrel ® 010 | — | — | — | — | — |
| Weight | 45.4 | 45.2 | 45.2 | 45.3 | 45.3 |
| Compression | 54 | 54 | 54 | 53 | 54 |
| C.O.R. | .810 | .809 | .809 | .810 | .808 |
| (Expected C.O.R.) | — | .808 | .8065 | .805 | .803 |
| Cold Crack | NB | NB | NB | NB | NB |
| Cut Test (1 = No Mark) (5 = Clean Cut) | 2–3 | 2–3 | 2–3 | 2–3 | 2–3 |

*Top-Grade Iotek (WT-%)

| Iotek 4000 | 52.38 |
|---|---|
| Iotek 8000 | 45.20 |
| Unitane 0–110 TiO$_2$ | 2.29 |
| Ultramarine Blue | 0.023 |
| Uvitex OB | 0.10 |
| Santonox R | 0.003 |

TABLE 4B

|  | Example: | | | |
|---|---|---|---|---|
|  | 6 | 7 | 8 | 9 |
| Top-Grade Iotek* | 95 | 90 | 85 | 80 |
| Primacor ® 5981 | — | — | — | — |
| Nucrel ® 925 | 5 | 10 | 15 | 20 |
| Primacor ® 3414 | — | — | — | — |
| Nucrel ® 010 | — | — | — | — |
| Weight | 45.1 | 45.2 | 45.3 | 45.2 |
| Compression | 54 | 55 | 55 | 55 |
| C.O.R. | .810 | .809 | .808 | .806 |
| (Expected C.O.R.) | .808 | .8065 | .805 | .803 |
| Cold Crack | NB | NB | NB | NB |
| Cut Test (1 = No Mark) (5 = Clean Cut) | 2–3 | 2–3 | 2–3 | 2–3 |

TABLE 4C

|  | Example: | | | |
|---|---|---|---|---|
|  | 10 | 11 | 12 | 13 |
| Top-Grade Iotek* | 95 | 90 | 85 | 80 |
| Primacor ® 5981 | — | — | — | — |
| Nucrel ® 925 | — | — | — | — |
| Primacor ® 3414 | 5 | 10 | 15 | 20 |
| Nucrel ® 010 | — | — | — | — |
| Weight | 45.2 | 45.2 | 45.2 | 45.1 |
| Compression | 54 | 55 | 56 | 56 |
| C.O.R. | .809 | .808 | .807 | .803 |
| (Expected C.O.R.) | .8075 | .805 | .803 | .801 |
| Cold Crack | NB | NB | NB | NB |
| Cut Test (1 = No Mark) (5 = Clean Cut) | 2–3 | 2–3 | 2–3 | 2–3 |

TABLE 4D

|  | Example: | | | |
|---|---|---|---|---|
|  | 14 | 15 | 16 | 17 |
| Top-Grade Iotek* | 95 | 90 | 85 | 80 |
| Primacor ® 5981 | — | — | — | — |
| Nucrel ® 925 | — | — | — | — |
| Primacor ® 3414 | — | — | — | — |
| Nucrel ® 010 | 5 | 10 | 15 | 20 |
| Weight | 45.1 | 45.2 | 45.2 | 45.2 |
| Compression | 54 | 54 | 56 | 57 |
| C.O.R. | .807 | .807 | .803 | .800 |
| (Expected C.O.R.) | .8075 | .805 | .803 | .801 |
| Cold Crack | NB | NB | NB | NB |
| Cut Test (1 = No Mark) (5 = Clean Cut) | 2–3 | 2–3 | 3 | 3 |

TABLE 5A

|  | Example: | | | | |
|---|---|---|---|---|---|
|  | 1 | 2 | 3 | 4 | 5 |
| Top-Grade Iotek | 100 | 95 | 90 | 85 | 80 |
| Escor ® ATX 310 | — | 5 | 10 | 15 | 20 |
| Escor ® ATX 320 | — | — | — | — | — |
| Escor ® ATX 325 | — | — | — | — | — |
| Weight | 45.2 | 45.2 | 45.2 | 45.2 | 45.2 |
| Compression | 57 | 57 | 58 | 57 | 57 |
| C.O.R. | .809 | .807 | .806 | .807 | .805 |
| (Expected C.O.R.) | — | .807 | .805 | .803 | .801 |
| Cold Crack | NB | NB | NB | NB | NB |
| Cut Test | 2–3 | 2–3 | 2–3 | 3 | 3 |

(1 = No mark)
(5 = Clean cut)

TABLE 5B

|  | Example: | | | |
|---|---|---|---|---|
|  | 6 | 7 | 8 | 9 |
| Top-Grade Iotek | 95 | 90 | 85 | 80 |
| Escor ® ATX 310 | — | — | — | — |
| Escor ® ATX 320 | 5 | 10 | 15 | 20 |
| Escor ® ATX 325 | — | — | — | — |

TABLE 5B-continued

| | Example: | | | |
|---|---|---|---|---|
| | 6 | 7 | 8 | 9 |
| Weight | 45.2 | 45.2 | 45.2 | 45.2 |
| Compression | 57 | 57 | 59 | 61 |
| C.O.R. | .806 | .803 | .803 | .802 |
| (Expected C.O.R.) | .807 | .805 | .803 | .801 |
| Cold Crack | NB | NB | NB | NB |
| Cut Test | 2-3 | 2-3 | 3 | 3 |

(1 = No mark)
(5 = Clean cut)

TABLE 5C

| | Example: | | | |
|---|---|---|---|---|
| | 10 | 11 | 12 | 13 |
| Top-Grade Iotek | 95 | 90 | 85 | 80 |
| Escor ® ATX 310 | — | — | — | — |
| Escor ® ATX 320 | — | — | — | — |
| Escor ® ATX 325 | 5 | 10 | 15 | 20 |
| Weight | 45.2 | 45.2 | 45.2 | 45.2 |
| Compression | 58 | 59 | 59 | 62 |
| C.O.R. | .806 | .803 | .802 | .801 |
| (Expected C.O.R.) | .807 | .805 | .803 | .802 |
| Cold Crack | NB | NB | NB | NB |
| Cut Test | 2-3 | 2-3 | 3 | 3 |

(1 = No mark)
(5 = Clean cut)

TABLE 6A

| Notebook 544-19- | 1 | 2 | 3 | 4 |
|---|---|---|---|---|
| Top Grade Iotek ® | 100 | — | — | — |
| Primacor ® 5981 | — | 100 | — | — |
| Nucrel ® 925 | — | — | 100 | — |
| Primacor ® 3414 | — | — | — | 100 |
| Nucrel ® 010 | — | — | — | — |
| Escor ® AT-325 | — | — | — | — |
| Escor ® AT-320 | — | — | — | — |
| Escor ® AT-310 | — | — | — | — |
| Weight | 45.2 | 45.1 | 45.0 | 45.1 |
| Compression | 55 | 61 | 60 | 61 |
| C.O.R. | .806 | .771 | .771 | .761 |
| Normalized For Table 4 $\times \frac{.810}{.806}$ | .810 | .775 | .775 | .765 |
| Normalized For Table 5 $\times \frac{.809}{.806}$ | .809 | — | — | — |

TABLE 6B

| Notebook 544-19- | 5 | 6 | 7 | 8 |
|---|---|---|---|---|
| Top Grade Iotek ® | — | — | — | — |
| Primacor ® 5981 | — | — | — | — |
| Nucrel ® 925 | — | — | — | — |
| Primacor ® 3414 | — | — | — | — |
| Nucrel ® 010 | 100 | — | — | — |
| Escor ® AT-325 | — | 100 | — | — |
| Escor ® AT-320 | — | — | 100 | — |
| Escor ® AT-310 | — | — | — | 100 |

TABLE 6B-continued

| Notebook 544-19- | 5 | 6 | 7 | 8 |
|---|---|---|---|---|
| Weight | 45.0 | 45.1 | 45.1 | 45.2 |
| Compression | 60 | 62 | 60 | 61 |
| C.O.R. | .760 | .770 | .765 | .767 |
| Normalized For Table 4 $\times \frac{.810}{.806}$ | .764 | — | — | — |
| Normalized For Table 5 $\times \frac{.809}{.806}$ | — | .773 | .768 | .770 |

TABLE 7A

| | Example: | | |
|---|---|---|---|
| | 1 | 2 | 3 |
| Iotek ® EX-993 (Li) | 100 | — | — |
| Iotek ® EX-994 (K) | — | 100 | — |
| Primacor ® 3414 | — | — | 100 |
| Weight | 45.2 | 45.2 | 45.1 |
| Compression | 59 | 60 | 60 |
| C.O.R. | .808 | .804 | .768 |
| (Expected C.O.R.) | — | — | — |
| Cold crack | NB | NB | — |
| Cut Test | 2-3 | 2-3 | 4-5 |

(1 = No Mark)
(5 = Clean Cut)

TABLE 7B

| | Example: | | | |
|---|---|---|---|---|
| | 4 | 5 | 6 | 7 |
| Iotek ® EX-993 (Li) | 95 | 90 | 85 | 80 |
| Iotek ® EX-994 (K) | — | — | — | — |
| Primacor ® 3414 | 5 | 10 | 15 | 20 |
| Weight | 45.2 | 45.1 | 45.2 | 45.2 |
| Compression | 60 | 61 | 59 | 59 |
| C.O.R. | .808 | .806 | .806 | .804 |
| (Expected C.O.R.) | .806 | .804 | .802 | .800 |
| Cold Crack | NB | NB | NB | NB |
| Cut Test | 2-3 | 2-3 | 2-3 | 3 |

(1 = No Mark)
(5 = Clean Cut)

TABLE 7C

| | Example: | | | |
|---|---|---|---|---|
| | 8 | 9 | 10 | 11 |
| Iotek ® EX-993 (Li) | — | — | — | — |
| Iotek ® EX-994 (K) | 95 | 90 | 85 | 80 |
| Primacor ® 3414 | 5 | 10 | 15 | 20 |
| Weight | 45.2 | 45.1 | 45.1 | 45.1 |
| Compression | 59 | 60 | 61 | 61 |
| C.O.R. | .804 | .803 | .803 | .802 |
| (Expected C.O.R.) | .802 | .800 | .799 | .797 |
| Cold Crack | NB | NB | NB | NB |
| Cut Test | 2-3 | 2-3 | 2-3 | 3 |

(1 = No Mark)
(5 = Clean Cut)

TABLE 8A

| | Example: | | |
|---|---|---|---|
| | 1 | 2 | 3 |
| Surlyn ® 7930 (Li) | 100 | — | — |
| Hi-Milan ® 7311 (Mg) | — | 100 | — |
| Primacor ® 3414 | — | — | 100 |
| Weight | 45.1 | 45.1 | 45.2 |
| Compression | 60 | 60 | 61 |
| C.O.R. | .804 | .803 | .768 |
| (Expected C.O.R.) | — | — | — |
| Cold Crack | NB | NB | 6/12 |
| Cut Test | 2–3 | 2–3 | 4–5 |

TABLE 8B

| | Example: | | | |
|---|---|---|---|---|
| | 4 | 5 | 6 | 7 |
| Surlyn ® 7930 (Li) | 95 | 90 | 85 | 80 |
| Hi-Milan ® 7311 (Mg) | — | — | — | — |
| Primacor ® 3414 | 5 | 10 | 15 | 20 |
| Weight | 45.1 | 45.2 | 45.2 | 45.2 |
| Compression | 61 | 59 | 60 | 59 |
| C.O.R. | .804 | .803 | .802 | .802 |
| (Expected C.O.R.) | .802 | .800 | .799 | .797 |
| Cold Crack | NB | NB | NB | NB |
| Cut Test | 2–3 | 2–3 | 2–3 | 3 |

TABLE 8C

| | Example: | | | |
|---|---|---|---|---|
| | 8 | 9 | 10 | 11 |
| Surlyn ® 7930 (Li) | — | — | — | — |
| Hi-Milan ® 7311 (Mg) | 95 | 90 | 85 | 80 |
| Primacor ® 3414 | 5 | 10 | 15 | 20 |
| Weight | 45.2 | 45.1 | 45.2 | 45.1 |
| Compression | 61 | 61 | 60 | 60 |
| C.O.R. | .803 | .802 | .802 | .801 |
| (Expected C.O.R.) | .801 | .800 | .798 | .796 |
| Cold Crack | NB | NB | NB | NB |
| Cut Test | 2–3 | 2–3 | 2–3 | 3 |

What is claimed is:

1. A method for forming a golf ball, comprising the steps of:
   A. providing a golf ball core;
   B. providing an ionic copolymer consisting essentially of a copolymer of an e-olefin having from 2–6 carbon atoms and a salt selected from the group consisting of metal salts, ammonium salts, and their mixtures of an unsaturated carboxylic acid having from 3–5 carbon atoms, said ionic copolymer having a first coefficient of restitution when formed into a golf ball cover;
   C. providing a non-ionic copolymer consisting essentially of a member of the group consisting of a copolymer of ethylene and acrylic acid; a copolymer of ethylene and methacrylic acid; a copolymer of propylene and acrylic acid; a terpolymer of ethylene, acrylic acid, and a lower alkylacrylate; and blends thereof, said non-ionic copolymer having a second coefficient of restitution when formed into a golf ball cover;
   D. blending from 80 to 95 pphr of said ionic copolymer and from 5 to 20 pphr of said non-ionic copolymer to form a blend having a third coefficient of restitution when formed into a golf ball cover, wherein said third coefficient of restitution is greater than the weighted average of the coefficients of restitution of said ionic copolymer and said non-ionic copolymer in said blend; and forming a cover made of said blend on said golf ball core.

2. The method of claim 1 wherein the amount of said non-ionic copolymer in the ionic/non-ionic copolymer blend is within the range of from about 10 to about 15 pphr.

3. The method of claim 2 wherein the non-ionic copolymer is a member of the group consisting of a copolymer of ethylene and acrylic acid, a copolymer of ethylene and methacrylic acid, a copolymer of propylene and acrylic acid and blends thereof.

4. The method of claim 3 wherein the non-ionic copolymer is a copolymer of ethylene and acrylic acid.

5. The method of claim 4 wherein said non-ionic copolymer is a copolymer of about 80 wt. % ethylene and about 20 wt. % acrylic acid.

6. The method of claim 4 wherein said non-ionic copolymer is a copolymer of about 85 wt. % ethylene and about 15 wt. % acrylic acid.

7. The method of claim 3 wherein the non-ionic copolymer is a copolymer of ethylene and methacrylic acid.

8. The method of claim 6 wherein said non-ionic copolymer is a copolymer of about 85 wt % ethylene and about 15 wt. % methacrylic acid.

9. The method of claim 3 wherein the non-ionic copolymer is a copolymer of propylene and acrylic acid.

10. The method of claim 1 wherein said non-ionic copolymer is a member of the group consisting of a terpolymer of ethylene, acrylic acid and a lower alkyl acrylate; and a terpolymer of ethylene, methacrylic acid, and a lower alkyl acrylate.

11. The method of claim 1 wherein the α-olefin of said ionic copolymer is ethylene, and said unsaturated carboxylic acid is a member of the group consisting of acrylic acid, methacrylic acid and ethacrylic acid.

12. The method of claim 1, wherein said non-ionic copolymer is a member of the group consisting of a copolymer of about 80 wt. % ethylene and about 20 wt. % acrylic acid, a copolymer of about 85 wt % ethylene and about 15 wt. % methacrylic acid, and mixtures thereof.

13. The method of claim 1, wherein said non-ionic copolymer consists essentially of from 75 to 85 wt. % ethylene moieties and from 15 to 25 wt. % acrylic acid moieties.

14. The method of claim 1, wherein said non-ionic copolymer consists essentially of 85 wt. % ethylene moieties and 15 wt. % acrylic acid moieties.

15. The method of claim 1, wherein said non-ionic copolymer consists essentially of 80 wt. % ethylene moieties and 20 wt. % acrylic acid moieties.

16. The method of claim 1, wherein said salt comprises at least one type of cation.

17. The method of claim 1, wherein said salt comprises cations selected from the group consisting of metal cations.

18. The method of claim 1, wherein said salt comprises cations selected from elements classified in Groups IA, IIA, or the transition elements of the Periodic Table and combinations thereof.

19. The method of claim 1, wherein said salt comprises cations selected from elements classified in Group IA of the Periodic Table and combinations thereof.

20. The method of claim 1, wherein said salt comprises cations selected from elements classified in Group IIA of the Periodic Table and combinations thereof.

21. The method of claim 1, wherein said salt comprises cations selected from transition elements and combinations thereof.

22. The method of claim 1, wherein said salt comprises cations of elements classified in Group IIB of the Periodic Table and combinations thereof.

23. The method of claim 1, wherein said salt comprises lithium cations.

24. The method of claim 1, wherein said salt comprises potassium cations.

25. The method of claim 1, wherein said salt comprises magnesium cations.

26. The method of claim 1, wherein said salt comprises calcium cations.

27. The method of claim 1, wherein said salt comprises sodium cations.

28. The method of claim 1, wherein said salt comprises zinc cations.

29. The method of claim 1, wherein said salt comprises ammonium cations.

* * * * *